Jan. 22, 1957
S. M. CLARK
2,778,057
METHOD AND APPARATUS FOR CONTINUOUSLY
STRETCHING PLASTIC FILM
Filed April 2, 1953
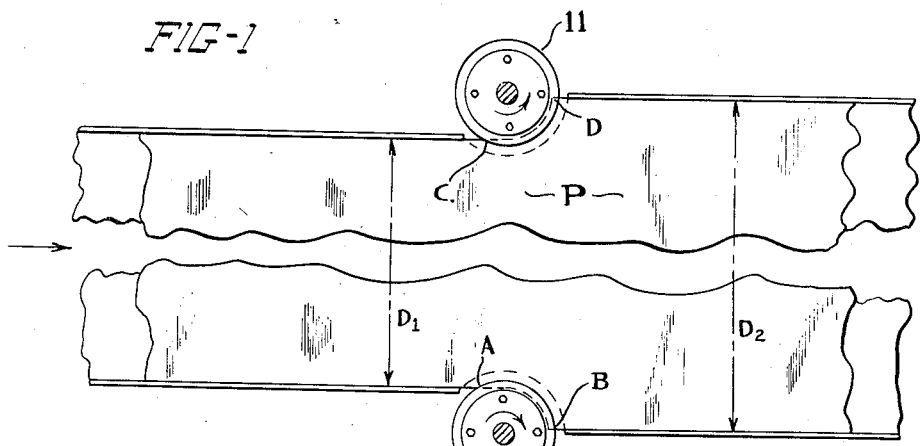
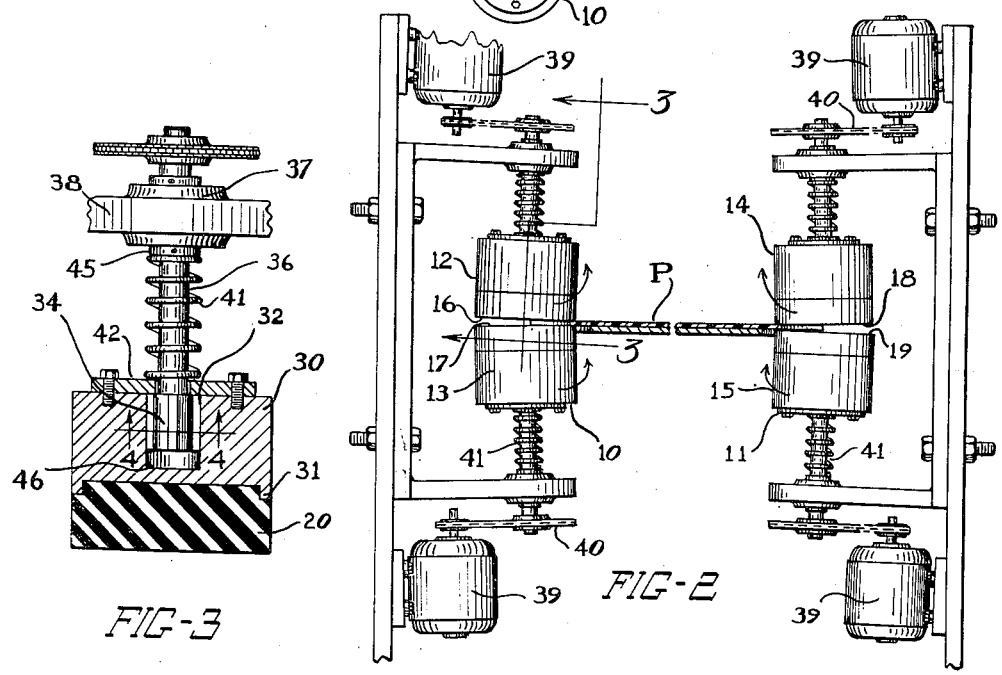
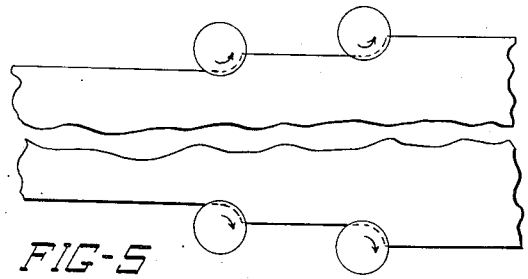
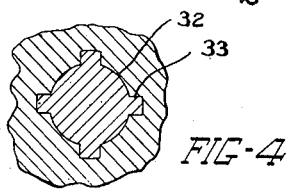
INVENTOR.
STANLEY M. CLARK United States Patent Office 2,778,057
Patented Jan. 22, 1957

2,778,057
METHOD AND APPARATUS FOR CONTINUOUSLY STRETCHING PLASTIC FILM

Stanley M. Clark, Parma, Ohio

Application April 2, 1953, Serial No. 346,307

13 Claims. (Cl. 18—1)

This invention relates to the treatment of plastic sheet and more particularly to means for continuously laterally stretching sheets of orientable plastic.

The physical properties of certain plastic materials are considerably improved by cold-stretching the material. For example, filaments of the crystalline type plastics, such as nylon, saran, polyethylene and the like, are usually cold-stretched by amounts up to 400% after extrusion. Such treatment has been found to increase the tensile strength of the filament as much as seven to eight times. Similar increases in physical properties have also been produced by cold-stretching sheet or film. However, continuous stretching of sheet in the longitudinal direction alone has been found to impart highly directional properties to the sheets which in many applications of use are found to be objectionable. When sheet is cold-stretched, say 400% in the longitudinal direction, as by passing it between a set of drive rolls while exerting a drag with a second set of rolls operated at a lower speed, the tensile strength will ordinarily be increased, as in filaments, seven to eight times in the longitudinal direction but will remain constant or increase but slightly in the transverse direction. To remedy this difficulty of directional properties, it has been proposed to stretch the sheet laterally as well as longitudinally.

However, lateral stretching has not heretofore been successfully accomplished on continuously moving sheet. The primary reason for the failure lies in the difficulty of continuously gripping the edges of the sheet while it moves forwardly in a longitudinal direction. In one type of prior art apparatus, pairs of diverging conveyor belts are used to grip the edges of the sheet so as to stretch it laterally. These have been unsuccessful because it is difficult to apply enough pressure to grip the edge of the sheet securely and to prevent slippage of the sheet between the belts. The result is that a non-uniform stretch is imparted to the sheet and the sheet tends to become wrinkled and puckered. Sheet which is so treated will not handle uniformly in subsequent treatments nor will it perform satisfactorily in use. Another attempted solution to the problem of lateral stretching contemplates the use of tentering frames, but such frames, like the belts referred to above, have been found to mark the sheet objectionably and to produce puckers in the edges of the sheet. Other means such as apparatus comprising a series of small rolls adapted to grip the edges of the sheet at spaced points have failed for similar reasons.

The present invention avoids the difficulties of the prior art and solves this problem of continuously stretching sheet in a lateral direction, while it is moving longitudinally, by providing a plurality of pairs of rollers having flat abutting faces which grip the edges of the sheet between them. The gripping rollers are preferably disposed so that the peripheral edges of the abutting faces grip the edges of the sheet, and they are rotated so as to advance the sheet longitudinally while stretching it laterally. The stretching may be performed by a set comprising two pairs of rollers of considerable size or alternatively a plurality of sets of smaller rollers may be used in a cascade arrangement which successively imparts increments of stretch to the sheet until the full stretch has been acquired. The apparatus is simple to build and maintain; it requires a minimum of adjustment and maintenance; and it is effective in producing a uniformly stretched product. A longitudinal stretch may simultaneously be imparted to the sheet if desired.

A primary object of the invention, therefore, is to produce means for imparting lateral stretch to plastic strip as it continuously advances longitudinally from a source of supply.

Another object is to provide means for stretching plastic sheet or film without tearing, marking or wrinkling the edges of the film.

A more specific object is to provide apparatus for imparting a lateral stretch to plastic sheet comprising two pairs of rotary members disposed respectively on opposite sides of the moving sheet and adapted to rotate in the direction of the movement of the sheet, each pair of members having flat abutting faces adapted to grip the edges of the strip therebetween.

Another object is to provide apparatus of the type described in which the end faces of the rotary gripping members are of resilient material and are disposed at an angle to each other whereby the extreme peripheral edges of the rotary members will grip the plastic sheet therebetween.

Another object is to provide apparatus which is cheap and simple in construction and which is easy to adjust and maintain.

Further objects and advantages will be more fully apparent from the following description of a preferred form of the invention, reference being had to the accompanying drawing in which:

Figure 1 is a plan view of the invention as it is used in laterally stretching a continuously moving sheet of plastic or like material;

Figure 2 is a fragmentary end elevation of the pair of stretching rollers of the apparatus of Figure 1;

Figure 3 is a vertical sectional view of one of the rollers of Figure 2, taken in the plane indicated by the lines 3—3 of Figure 2;

Figure 4 is a fragmentary transverse sectional view taken in the plane indicated by the lines 4—4 of Figure 3; and Figure 5 is a diagrammatic view similar to Figure 1 showing a plurality of stretching units arranged in cascade fashion with respect to the longitudinally moving plastic sheet.

A preferred form of the invention, as illustrated, comprises a stretching unit consisting of two pairs of roller members, indicated generally at 10 and 11, disposed to impart a lateral stretch to a sheet P of plastic material as it moves longitudinally in a direction indicated by the arrow in Figure 1. The plastic sheet may be delivered from any source of supply (not shown), such as a calender, and is delivered by suitable driving rollers to the stretching unit. The sheet or film may be polyethylene or any other of crystalline, orientable plastics and is in an orientable condition by the time it reaches the rollers 10 and 11.

Each of the pairs of rollers 10 and 11 of Figure 1 has the construction shown in Figures 2 and 3; the pair of rollers 10 comprising a top roller 12 and a bottom roller 13, and the pair 11 comprises corresponding rollers 14 and 15. The rollers have flat abutting faces 16, 17, 18 and 19, respectively, which are adapted to grip the edges of the sheet between them. As the rollers rotate in opposite directions, as indicated in Figure 1, corresponding points on the abutting faces of the two pairs of rollers will move apart and a substantial lateral stretch will be imparted to the sheet. Once the rollers have stretched the sheet to the desired diameter, they release the sheet and permit it to be carried forward longitudinally. It will be observed from Figure 1, that the stretch imparted will be from the initial diameter indicated as $D_1$ to the final diameter indicated as $D_2$.

The end portions 20 of the rollers are preferably of resilient materials such as rubber or the like, and the axes of the rollers of each pair are tilted at an angle as shown in Figure 2 so that the end faces of the rollers abut over a limited area. These two features permit the peripheral edges of end faces of the rollers to grip the edge of the sheet securely and with maximum force. At the same time, this arrangement enables the sheet to be readily gripped and released. Thus, the limited area of abutment of each pair of rolls is bounded by the arc AB and the chord AB for pair 10 and by the arc CD and chord CD for pair 11. At all other points the adjacent faces of the rolls are spaced apart. Thus, the sheet is fed into the bite of the rollers at a point just in front of their first points of abutment, A and C, and is released from the rollers at substantially the points B and D, the points of maximum longitudinal movement of the rollers. The plastic sheet is thus laterally stretched by pulling the opposite edges of the sheet into arcuate paths of opposite curvature. It is to be noted that the plastic sheet is carried forward longitudinally, simultaneously with the lateral stretching, and that because of the arcuate paths of stretch the lateral stretch begins slowly, giving opportunity for the plastic sheet to "set" within the bite of the rolls, and then progressively increases to a maximum which is at the point of release. At the moment of release there is very little longitudinal movement of the sheet and it may at times be convenient to exert a forward pull upon the sheet so as to longitudinally stretch it immediately after it is released from the rollers.

The manner of mounting and driving the roller members is best shown in Figures 2 and 3. Each roller comprises a metal body 30 having the resilient, preferably rubber, end portions 20 vulcanized thereto. If desired, lugs 31 may be provided to strengthen the bond between the rubber and the body. The body has a central bore 32 having longitudinal grooves 33, see Figure 4, adapted to receive in snug telescoping fit the splined end 34 of a drive shaft 36. The drive shafts are journalled at 37 in supporting plates 38 and are each driven by electric motors 39 through the chain and sprocket drives 40. The end faces of each pair of rollers are urged into abutment with each other by coil springs 41, confined between the plates 42 which are secured to the roller bodies and suitable abutments 45 on the drive shafts.

It will be noted that a clearance indicated at 46 is provided between the ends of the drive shafts and the bottom of the bores 32 so that the roller bodies are free to take the required longitudinal positions. The speeds of the motors are synchronized so that the rollers turn at the same speeds, but if difficulty is encountered, a single source of power and a single drive system may be used. If desired, the end faces may be provided with a toothed frictional surface (not shown).

Although the apparatus has been shown to be useful for the cold stretching of plastic film, it will be apparent that the principles and features of the invention can be readily used for stretching heated films of plastic material.

Various modifications and changes will be apparent to those skilled in the art without departing from the spirit and scope of the invention, the essential features of which are summarized in the appended claims.

What is claimed is:

1. Apparatus for continuously stretching plastic film in a lateral direction, comprising two pairs of roller members disposed on opposite sides of said sheet as it moves forward in a longitudinal direction, each pair of roller members being cantilever-supported with exposed flat end faces adapted to grip the edges of the sheet therebetween, said pairs of members being driven in opposite directions about axes substantially transverse to the plane of said film, whereby to pull said edges through diverging arcuate paths substantially in the plane of the sheet.

2. Apparatus according to claim 1 in which the axes of rotation of the roller members of each pair are slightly tilted with respect to each other whereby said end faces have a limited area of abutment.

3. Apparatus according to claim 2 in which said end portions adjacent said faces comprise a yieldable resilient material, whereby said faces tend to abut each other over an appreciable area bounded by a limited arc.

4. Apparatus according to claim 3 in which said end faces have a friction surface.

5. Apparatus according to claim 1 and means comprising a pair of rolls extending transversely across said plastic film and positively engaging said film to exert a longitudinal force upon said film while it is still gripped by said roller members whereby to stretch said film longitudinally simultaneously with the lateral stretching.

6. Apparatus for continuously stretching plastic film in a lateral direction comprising two pairs of roller members disposed on opposite sides of said sheet as it moves forward in a longitudinal direction, the members of each pair being cantilever-supported and having abutting end faces adapted to grip portions of the sheet therebetween, said pairs of members being driven in opposite directions about axes substantially transverse to the plane of said film whereby to pull said portions through diverging arcuate paths, and at least two more pairs of roller members longitudinally spaced from said first pairs and adapted to grip the portions of the sheet after it leaves said first pairs of members and further stretch said film.

7. Apparatus for continuously stretching plastic film in a lateral direction, comprising two pairs of roller members disposed on opposite sides of said sheet as it moves forward in a longitudinal direction, each pair of roller members having end faces adapted to grip the portions of the sheet therebetween, said pairs of members being rotatable in opposite directions about axes substantially transverse to but slightly tilted with respect to the plane of said film.

8. Apparatus for continuously stretching plastic film in a lateral direction, comprising two pairs of roller members disposed on opposite sides of said sheet as it moves forward in a longitudinal direction, each pair of roller members having end faces adapted to grip the portions of the sheet therebetween, said pairs of members being rotatable in opposite directions about axes substantially transverse to but slightly tilted with respect to the plane of said film, the members of each pair being mounted on and positively driven by shafts, one of the rollers of each pair having a lost motion connection with its shaft permitting movement of the roller longitudinally on the shaft, and means to urge the end faces of the roller members of each pair forcibly toward each other.

9. The method of continuously stretching a sheet of plastic material in a lateral direction as it moves continuously forward in a longitudinal direction, which comprises gripping laterally spaced portions of said sheet, pulling said portions away from each other in oppositely directed arcuate paths whereby the plastic material between said portions is stretched laterally at an increasing rate while it moves longitudinally forward at a decreasing rate.

10. The method of continuously stretching a sheet of plastic material in a lateral direction as it moves continuously forward in a longitudinal direction which comprises gripping laterally spaced portions of said sheet, pulling said portions away from each other in oppositely directed circular arcuate paths whereby the plastic material between said portions is stretched laterally at an increasing rate while it moves forward at a decreasing rate and releasing said portions after said paths have extended through not more than a quadrant of arc.

11. The method of continuously stretching a sheet of film of plastic material in a lateral direction as it moves forward continuously in a longitudinal direction which comprises gripping spaced portions of said sheet, pulling said portions away from each other in a lateral direction while moving said portions forwardly in a longitudinal direction, the lateral separation of said portions being carried on at an increasing rate and the simultaneous forward movement of the portions being at a decreasing rate.

12. The method of continuously stretching a sheet of plastic material in a lateral direction as it moves forward in a longitudinal direction which comprises sandwiching laterally spaced portions of said sheet between cushions of resilient material and applying forces through said cushions to said portions to move said portions away from each other in laterally diverging arcuate paths.

13. The method of continuously stretching a sheet of plastic material in a lateral direction as it moves forward in a longitudinal direction which comprises sandwiching laterally spaced portions of said sheet between cushions of resilient material and applying forces through said cushions to said portions to move said portions away from each other in circular arcuate paths.

References Cited in the file of this patent

UNITED STATES PATENTS

| | | |
|---|---|---|
| 2,297,645 | Bailey | Sept. 29, 1942 |
| 2,320,691 | Wright | June 1, 1943 |
| 2,334,022 | Minich | Nov. 9, 1943 |
| 2,429,177 | Young | Oct. 14, 1947 |
| 2,483,339 | Gardner et al. | Sept. 27, 1949 |

FOREIGN PATENTS

| | | |
|---|---|---|
| 400,597 | Great Britain | Apr. 21, 1933 |